(12) United States Patent
Koschitzky

(10) Patent No.: US 6,334,923 B1
(45) Date of Patent: Jan. 1, 2002

(54) METHOD OF PRODUCING MULTIPLE LAMINATED SHINGLES

(75) Inventor: Henry Koschitzky, Downsview (CA)

(73) Assignee: IKO Industries Ltd., Toronto (CA)

( * ) Notice: Subject to any disclaimer, the term of this patent is extended or adjusted under 35 U.S.C. 154(b) by 0 days.

(21) Appl. No.: 09/411,865

(22) Filed: Oct. 4, 1999

(51) Int. Cl.[7] .............................. B32B 31/00; E04D 1/12
(52) U.S. Cl. .................... 156/260; 156/264; 156/271; 156/263; 156/512; 52/518; 52/749.12
(58) Field of Search ................................. 156/259, 260, 156/264, 265, 270, 271, 512, 263; 52/518, 749.12; 83/920; 428/141

(56) References Cited

U.S. PATENT DOCUMENTS 4,198,257 A * 4/1980 Pfaff ........................... 156/260
6,220,329 B1 * 2/2001 King et al. .................. 156/512

* cited by examiner

Primary Examiner—Linda Gray
(74) Attorney, Agent, or Firm—Bereskin & Parr

(57) ABSTRACT

A method of making multiple laminated shingles from a single sheet of roofing material. When four shingles are to be made, the sheet is cut into five strips, namely first and second double shims, first and second single tooth strips, and a double tooth strip. Each double shim is then laminated below the tooth portion of a single tooth strip and the tooth portion at one side of a double tooth strip, to produce a single lamination strip. The lamination strip is then slit lengthwise and crosscut by a single conventional shingle cutter to produce four sets of shingles across the width of the lamination strip. The process can produce other numbers of shingle sets. In all cases, the various strips needed are, after being cut, reassembled into a single lamination strip so that they can be slit and crosscut by a single standard shingle cutter.

7 Claims, 2 Drawing Sheets

METHOD OF PRODUCING MULTIPLE LAMINATED SHINGLES

FIELD OF THE INVENTION

This invention relates to a method of producing multiple laminated shingles (i.e. a multi-layer shingles).

BACKGROUND OF THE INVENTION

Laminated shingles are very well known and are shown for example in U.S. Pat. No. 5,209,802 to Hannah et al. and U.S. Pat. No. 5,426,902 to Stahl et al. In laminated shingles, several layers of roofing material are laminated together (by a suitable adhesive) to provide an appearance characterized by variations in thickness, which appearance cannot readily be achieved by a single layer shingle. In addition, the different layers can be coated with different color surfacing material and can have cutouts located in various locations to provide an attractive appearance.

It is also known to produce multiple laminated shingles from a single sheet, as will be described shortly. However, in this prior art method which will be described, four laminating machines and four crosscutters are required. In addition, in the prior art method the sheet is slit by a pattern cutter into eight sheets, all eight of which must be moved from the pattern cutter to the four laminating machines. The resultant four laminated strips must then be moved from the four laminating machines to four crosscutters. The number of machines needed, and the complexity of the material handling, increase the cost of production and reduce the efficiency of the process.

BRIEF SUMMARY OF THE INVENTION

It is therefore an object of the invention to provide a method of producing multiple laminated shingles, in which in a preferred embodiment, the operations required to produce the shingles can be carried out in a simple manner with fewer machines and simpler material handling methods.

In one of its aspects the invention provides a method of making a laminated shingle from at least one sheet of roofing material, comprising: (a) producing from said at least one sheet a plurality of strips; (b) assembling said strips into a single laminated sheet; and (c) slitting and crosscutting said laminated sheet on a single cutter into a plurality of lanes of shingles.

In another aspect the invention provides a method of making a laminated shingle from a sheet of roofing material comprising: (a) cutting said sheet of roofing material into five strips, said strips comprising first and second double shims, first and second single tooth strips each having a pair of opposed sides and teeth at one side thereof forming a tooth portion thereof, and a double tooth strip having a pair of opposed sides each with teeth thereat forming two tooth portions of said double tooth strip; (b) laminating said first shim below the tooth portion of said first single tooth strip and below one tooth portion of said double tooth strip to form one side of a lamination strip; (c) laminating said second shim below the tooth portion of said second single tooth strip and the other tooth portion of said double tooth strip to produce another side of said lamination strip; (d) slitting lengthwise and crosscutting said lamination strip to produce four shingles across the width of said lamination strip.

Further objects and advantages of the invention will appear from the following description, taken together with the accompanying drawings.

DETAILED DESCRIPTION OF PREFERRED EMBODIMENT

Figure 1:
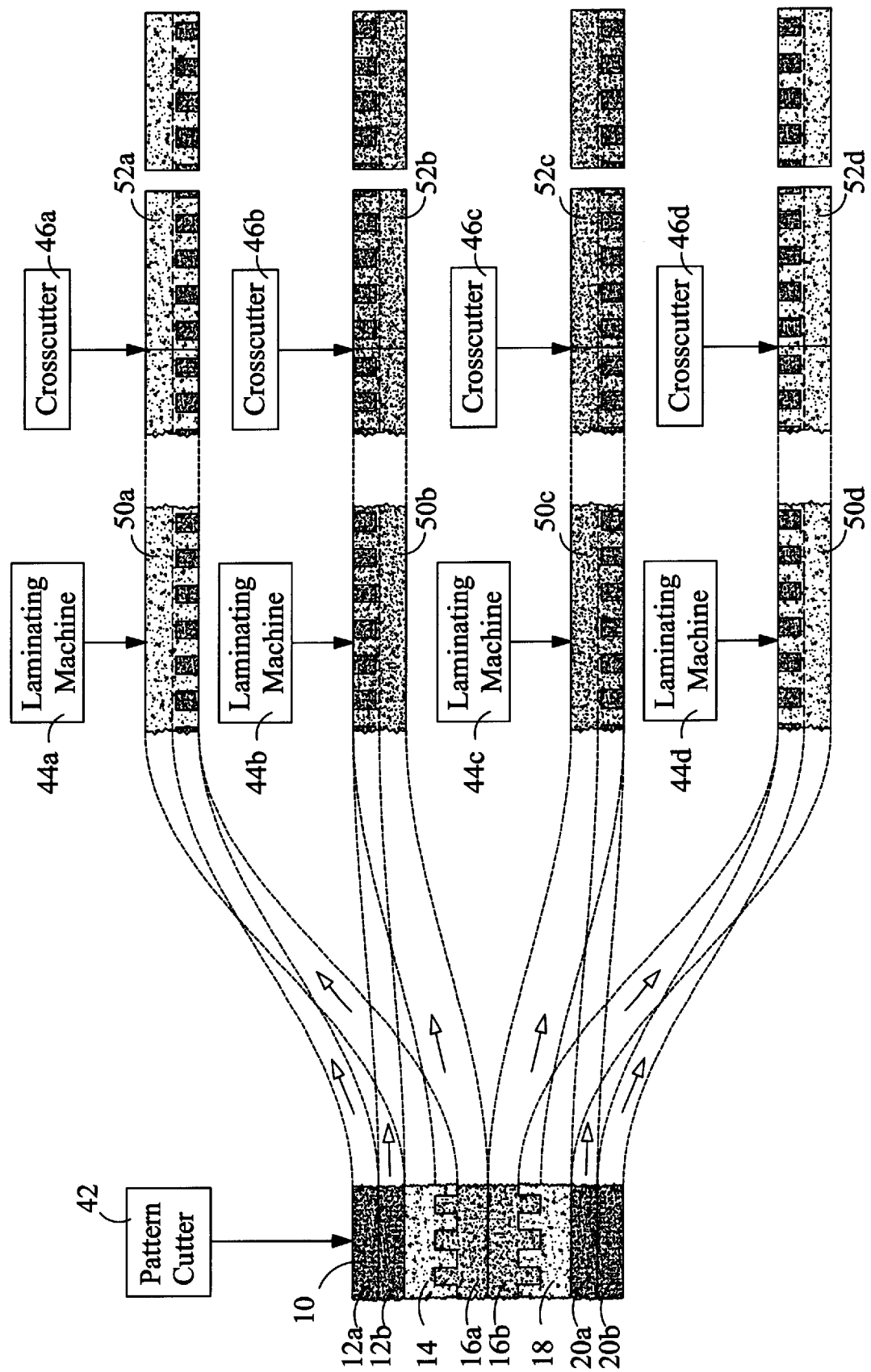
FIG. 1 is a plan view showing a typical prior art method of producing four laminated shingles.

Reference is first made to FIG. 1, which illustrates a typical prior art method of producing four laminated shingles from a single sheet. FIG. 1 shows a sheet 10 of conventional roofing material, typically formed of a base mat (either felt or glass fiber) coated with asphalt and with surfacing material such as crushed stone granules applied to the surface of the asphalt. Machines for producing sheets of such material have been very well known for many years.

The sheet 10 is cut lengthwise into four shims 12a, 12b, 20a, 20b, and four tooth strips 14, 16a, 16b, 18 by a conventional pattern cutter 42. The teeth of strips 14, 16a dovetail with each other to avoid wasting material, as do the teeth of strips 16b, 18.

After the strips described have been cut by pattern cutter 42, they are moved forwardly along paths of travel indicated by the arrows in FIG. 1. Specifically, shim 12a is moved beneath the tooth portion of tooth strip 14 and is laminated thereto to form a lamination strip 50a, by a conventional laminating machine 44a. The lamination strip 50a is then crosscut into shingles 52a by a conventional crosscutter 46a.

Similarly, shims 12b, 20a, 20b are moved beneath the tooth portions of tooth strips 16a, 16b, 18 respectively and laminated thereto by laminating machines 44b, 44c, 44d. The resultant lamination strips 50b, 50c, 50d are cut by conventional crosscutters 46b, 46c, 46d into shingles 52b, 52c, 52d respectively.

As mentioned in the introduction of this application, in the FIG. 1 prior art method, four laminating machines and four crosscutters are required. In addition it will be seen that eight strips have to be moved from the pattern cutter to the four laminating machines. Four lamination strips must then be moved from the four laminating machines to four crosscutters. The number of machines needed and the complexity of the material handling increases cost and reduces the efficiency.

Figure 2:
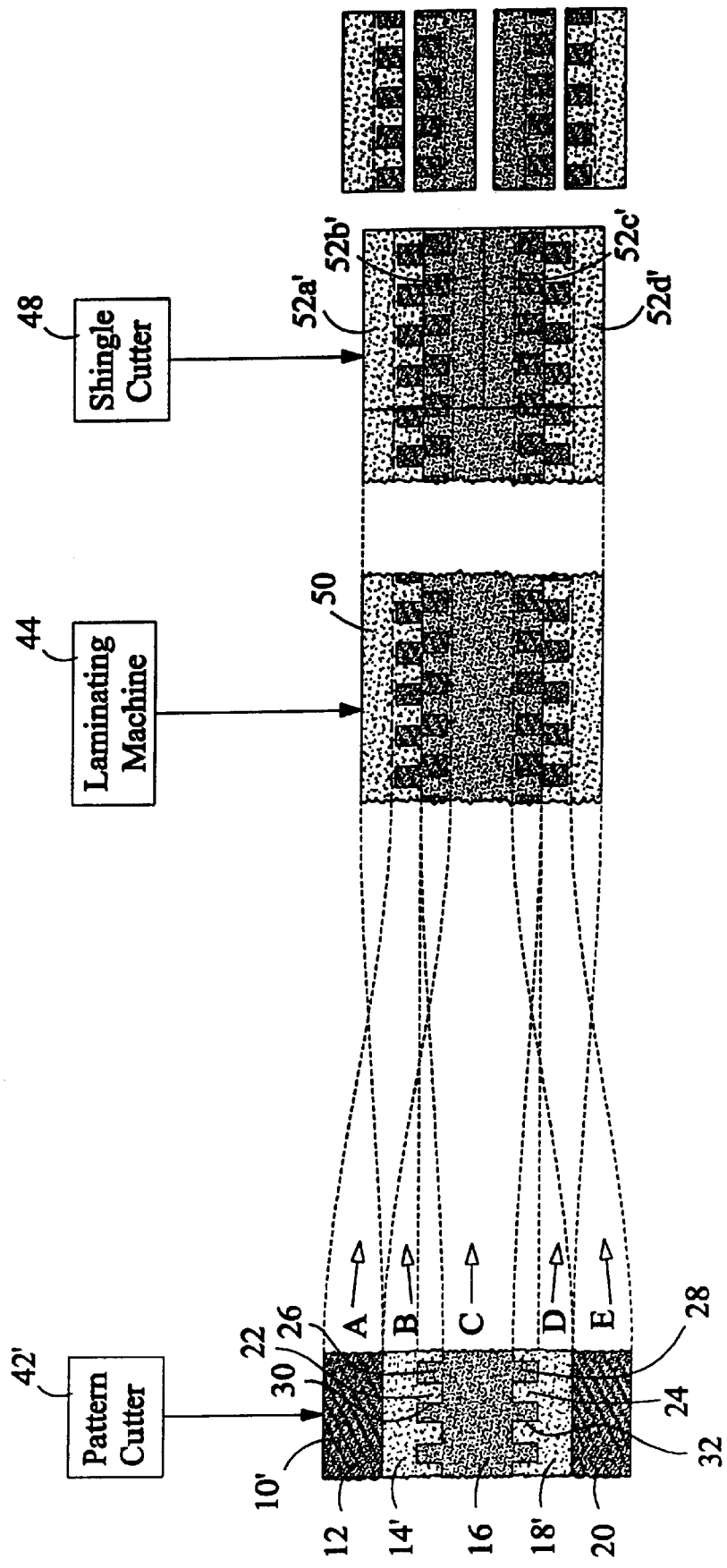
FIG. 2 is a plan view showing a method of producing four laminated shingles according to the invention.

Reference is next made to FIG. 2, which shows a preferred method according to the invention and in which primed reference numerals indicate parts corresponding to those of FIG. 1.

In FIG. 2, the sheet 10' is shown as having been cut lengthwise into various strips by conventional pattern cutter 42'. These strips are (from one side to the other): a double shim 12 (i.e. shims 12a and 12b from FIG. 1, combined), a single tooth strip 14' (the same as tooth strip 14 from FIG. 1), a double tooth strip 16 (the same as tooth strip 16a, 16b from FIG. 1 combined), another single tooth strip 18' (the same as tooth strip 18 from FIG. 1), and a double shim 20 (the same as shim strips 20a, 20b from FIG. 1, combined).

As shown, each of the single tooth strips 14', 18' has a series of teeth 22, 24 respectively projecting from its inwardly facing edge (inwardly meaning inwardly of the sheet 10'). The double tooth strip 16 has a set of teeth 26, 28 projecting outwardly from each of its edges, located between the slots 30, 32 formed when the teeth 22, 24 were cut. (As is conventional, all tooth strips dovetail so that no material is wasted.)

In FIG. 2, the double shims 12, 20, the single tooth strips 14', 18', and the double tooth strips 16 are shown with different patterns of shading so that these pieces can easily be distinguished in the drawings. In practice, these pieces can have the same or differently colored blends of granules applied to them.

According to the method shown in FIG. 2, after the strips described above have been cut, they are assembled as follows, and as shown in FIG. 2. The double tooth strip 16 is moved forwardly along path C. The single tooth strip 14' is moved forwardly along path B and over to the left of double tooth strip 16 (left as is seen along the path of travel of the pieces) so that the inner edge of single tooth strip 14' nearly touches the outer edge of double tooth strip 16, with both such strips being in the same plane. More specifically, the inner edge of single tooth strip 14' is spaced laterally by about one-eighth inch from the outer edge of double tooth strip 16, for reasons to be described.

The double shim 12 is moved forwardly along path A, and slightly downwardly, so that it moves beneath the tooth portion of the single tooth strip 14' and the tooth portion at the left side of the double tooth strip 16 (normally with an equal portion of the double shim 12 located beneath each strip 14', 16). The double shim 12 is then laminated to single tooth strip 14' and to the left side of double tooth strip 16 to form the left half of a single lamination strip 50. The lamination is performed by applying adhesive to appropriate portions of the lower portion of the single tooth strip 14' and the double tooth strip 16 and passing these tooth strips and double shim 12 through a conventional laminating machine diagrammatically indicated at 44.

The right hand side of the lamination strip 50 is formed in the same way. Specifically, single tooth strip 18 ' is moved along path D to a location in the same plane as and beside the right hand side of double tooth strip 16, with the respective edges of these two strips spaced slightly apart as for the left hand side (typically by one-eighth inch). Double shim 20 is moved forwardly along path E beneath the tooth portion of strips 18', 16 and is laminated thereto by the laminating machine 44, to form the right hand side of lamination strip 50.

After the lamination strip 50 has been formed, it is slit lengthwise and is crosscut, by a conventional shingle cutter 48 to produce four lanes of shingles 52a', 52b', 52c' and 52d' which can be the same as the correspondingly numbered shingles of FIG. 1. The resultant shingles can be applied to a roof in any desired pattern.

It will be seen from FIG. 2 that the double shim 12 is of width slightly greater than (usually about two inches greater than) the width of the tooth portion of single tooth strip 14' plus the width of the tooth portion at the left side of double tooth strip 16, so that there will be no gaps left uncovered by the shim 12 in the spaces between the teeth of strip 14', and in the spaces between the teeth of strip 16, after the lamination process. The same comment applies to the width of double shim 20.

It will be seen that the method of the invention, as described in FIG. 2, requires movement of only five strips of material instead of eight to the laminating stage, and requires only a single laminating machine instead of four separate machines. In addition, only a single shingle cutter is required in place of four crosscutters, and the length of the shingles produced is better controlled since they are all cut on a single cutter.

A feature of the invention, in one of its aspects, is that while the sheet 10 is cut into various strips prior to the lamination process, these strips are all reassembled into a single lamination sheet during the lamination process (preferably although not necessarily by a single laminating machine). Since the result of the lamination process is a single lamination sheet, a single standard shingle cutter can be used to cut the lamination sheet into lanes of shingles, and to crosscut the lanes into individual shingles. Since a single conventional shingle cutter 48 is used, therefore the shingle cutter 48 and the conventional take off sections of the line following it (not shown) can also be used for conventional shingle production, without requiring a separate line. This flexibility in the use of production machinery allows more efficient production of various kinds of shingles.

As previously mentioned, during the assembly of the lamination strip, the inner edge of single tooth strip 14' is spaced by a short distance (typically one-eighth inch) from the outer edge of double tooth strip 16. The reason for this is that if the edges of the strips abutted, then since there are usually tolerances in the manufacturing process, the edges of the teeth of one strip could overlap slightly the edges of the teeth of the other strip or penetrate slightly into the spaces between such teeth. Then, during the cutting process, very small pieces of the edges of the teeth would be cut off and could fall into undesirable locations or otherwise interfere with the manufacturing process. With the slight spacing as described, then if the cut is perfect, the edges of the teeth will be set back slightly (typically one-sixteenth inch) from the edges of the shim below them, which appears simply as a stylistic feature. (The same comments apply to the assembly of the right hand side of the lamination strip.)

While FIG. 2 shows production of four lanes of laminated shingles, it would be realized that if desired, only two lanes could be produced (e.g. lanes 52a', 52b') by changing double tooth strip 16 to a single tooth strip and eliminating single tooth strip 18' and shim 20. In that case, shim 12 will be laminated beneath the tooth portion of single tooth strip 14' and the tooth portion of the single tooth strip replacing double tooth strip 16, and the resultant lamination strip will be slit and crosscut by shingle cutter 48 as before.

Alternatively, if desired the method can be used to produce six (or more) lanes of shingles. (With six lanes, typically one extra double tooth strip and one extra shim may be used.)

While it has been assumed that the various strips shown in FIGS. 1 to 3 are supplied from a single sheet of roofing material, if desired they can be provided from more than one sheet and can be moved to needed locations in the process.

While preferred embodiments of the invention have been described, it will be appreciated that various changes may be made, and such changes are intended to be encompassed in the appended claims.

I claim:

1. A method of making a laminated shingle from at least one sheet of roofing material, comprising:
   (a) producing from said at least one sheet a plurality of strips, said strips including at least two tooth strips each having a pair of opposed sides and teeth at one side thereof forming a tooth portion thereof, and a shim;
   (b) assembling said strips into a single laminated sheet, such assembly including laminating said shim below said tooth portions of said tooth strips; and
   (c) slitting and crosscutting said laminated sheet on a single cutter into a plurality of sets of shingles.

2. A method of making a laminated shingle from at least one sheet of roofing material, comprising:
   (a) producing from said at least one sheet a plurality of strips, said strips including at least first and second single tooth strips each having a pair of opposed sides and teeth at one side thereof forming a tooth portion thereof, and a double tooth strip having a pair of opposed sides each with teeth thereat forming two tooth portions of said double tooth strip, and first and second shims;

(b) assembling said strips into a single laminated sheet, such assembly including laminating said first shim below the tooth portion of said first single tooth strip and below one tooth portion of said double tooth strip, such assembly further including laminating said second shim below the tooth portion of said second single tooth strip and the other tooth portion of said double tooth strip; and (c) slitting and crosscutting said laminated sheet on a single cutter into a plurality of sets of shingles.

3. A method according to claim 2 wherein in said assembly step, said tooth portion of said first single tooth strip and said one tooth portion of said double tooth strip are located in a slightly spaced apart position, and said tooth portion of said second single tooth strip and the other tooth portion of said double tooth strip are also located in a slightly spaced apart position.

4. A method according to claim 1, 2 or 3 wherein said strips are all cut from a single sheet of roofing material.

5. A method of making a laminated shingle from a sheet of roofing material comprising:

(a) cutting said sheet of roofing material into five strips, said strips comprising first and second double shims, first and second single tooth strips each having a pair of opposed sides and teeth at one side thereof forming a tooth portion thereof, and a double tooth strip having a pair of opposed sides each with teeth thereat forming two tooth portions of said double tooth strip;

(b) laminating said first shim below the tooth portion of said first single tooth strip and below one tooth portion of said double tooth strip to form one side of a lamination strip;

(c) laminating said second shim below the tooth portion of said second single tooth strip and the other tooth portion of said double tooth strip to produce another side of said lamination strip; and (d) slitting lengthwise and crosscutting said lamination strip to produce four shingles across the width of said lamination strip.

6. A method according to claim 5 in which said first single tooth strip is moved beside and in the same plane as said double tooth strip with the tooth portions of each spaced slightly apart, prior to laminating said first shim there below, and said second single tooth strip is moved beside and in the same plane as said double tooth strip with the tooth portions of each spaced slightly apart prior to lamination of said second shim therebelow.

7. A method according to claim 6 wherein said first shim is of width greater than the width of the tooth portion of said first single tooth strip plus the width of one tooth portion of said double tooth strip, and the width of said second shim is of width greater than the width of the tooth portion of said second single tooth strip plus the width of the tooth portion of said double tooth strip.

* * * * *